UNITED STATES PATENT OFFICE.

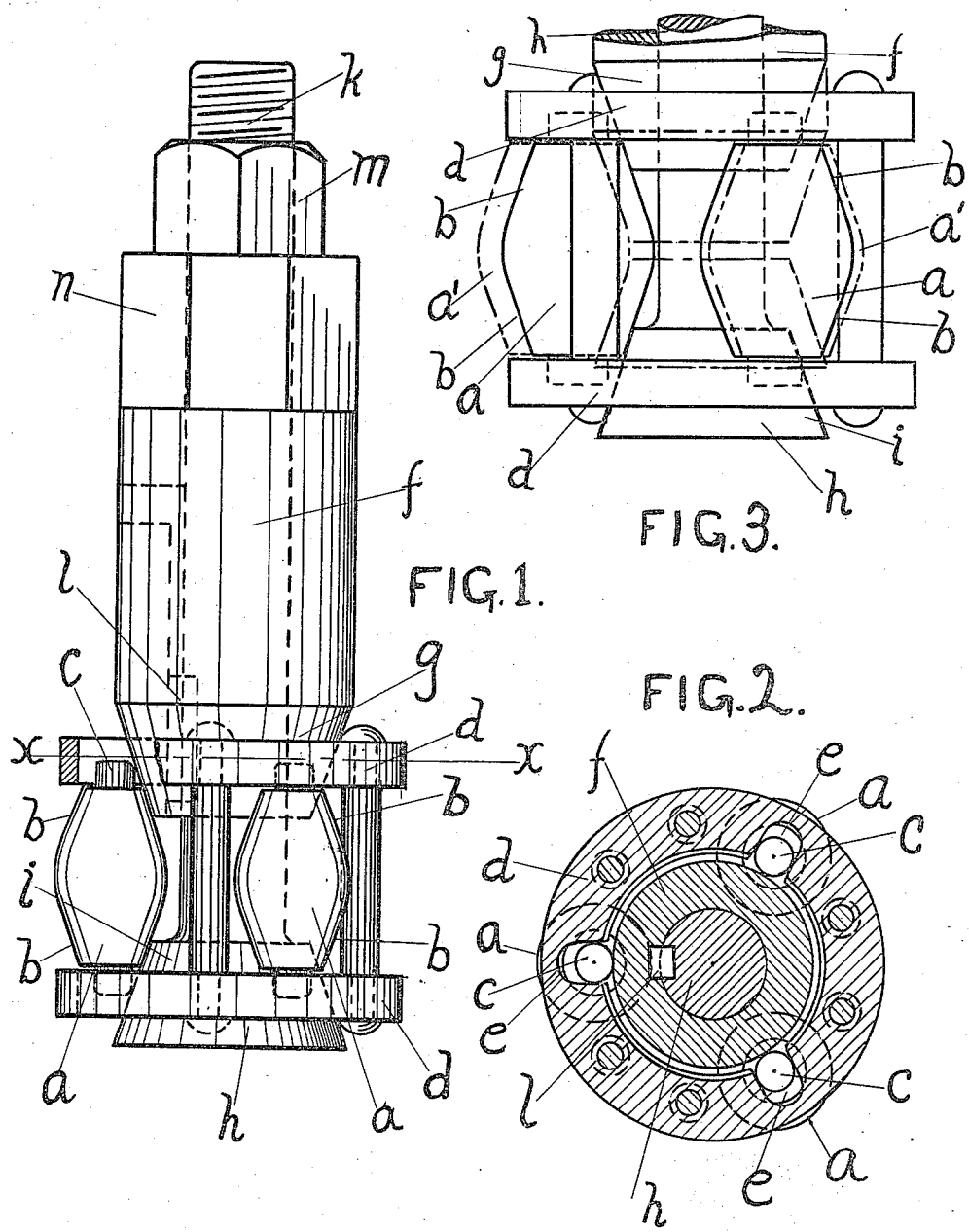

WILLIAM R. HAYSOM, OF QUINCY, MASSACHUSETTS.

DEVICE FOR EXPANDING PIPES, TUBES, &c.

1,063,258.

Specification of Letters Patent.

Patented June 3, 1913.

Application filed September 27, 1907. Serial No. 394,780.

*To all whom it may concern:*

Be it known that I, WILLIAM R. HAYSOM, a citizen of the United States, residing at Quincy, county of Norfolk, State of Massachusetts, have invented a new and useful Device for Expanding Pipes, Tubes, &c.

My invention relates to expanders for pipes, tubes, and the objects of my invention are to produce a simple and efficient device which shall be compact and easy to operate, be adapted to effect localized progressive expansion of a tube or pipe by rolling the material thereof, be free from the liability of the rollers to stick and fail to rotate and be capable of continued use without injurious wear or deformation of the parts. I attain these objects in the manner illustrated in the accompanying drawings in which,—

Figure 1 is a side view of the expander with the roller cage partly in section. Fig. 2 is a section of the parts at the plane indicated by "x x" in Fig. 1. Fig. 3 is a view of the expander head, illustrating the change in position of the expanding rollers.

Similar letters refer to similar parts throughout the several views.

(a) represents hardened steel rollers formed with convex, spherical or spheroidal middle bodies and conical or tapered ends (b) and having pivots or spindles (c) projecting from each end.

(d) represents a cage, preferably formed of two rings secured and supported by suitable distance pieces, provided with elongated bearings, (e) to receive the pivots or spindles (c) of the rollers (a).

(f) is a sleeve one end of which is of hardened steel, tapered as indicated at (g), this taper corresponding to the taper (b) of the corresponding ends of the rollers (a).

(h) is a spindle traversing the sleeve and provided with a hardened steel head constructed with conical surfaces (i) corresponding to the taper (b) of ends of the rollers (a) which contact therewith, and threaded at its other end as indicated at (k).

(l) is a key secured to the spindle (h) and capable of lateral movement in a keyway cut in the sleeve (f), as indicated by dotted lines in Fig. 1.

(m) is a nut threaded to take the threaded end (k) of the spindle (h).

(n) represents hexagonal or other surfaces at the end of the sleeve (f) to receive a wrench for rotating the device.

The device is operated by inserting the head of the expander into the pipe or tube to be expanded until the enlarged portions of the expanding rollers are at a point in the pipe at which the expansion is desired. By setting up the nut (m) on the threaded portion of the spindle (k), the sleeve (f) with its tapered surfaces (g) is forced toward the conical surfaces (i) of the head on the spindle (h), thereby forcing the expanding rollers (a) outwardly against the pipe. The key (l) prevents the spindle (h) from revolving within the sleeve (f) as the nut (m) is set up. By then rotating the entire device by means of a wrench applied at (n) or otherwise, the rollers (a), having been forced out into contact with the pipe or tube to be expanded, will expand the tube or pipe at the surfaces of contact of the rollers with the pipe; and, by setting up the nut (m) from time to time, and continuing the rotation of the expander as a whole, the process of expanding the pipe at the desired point may be carried to any degree desired.

Fig. 3 illustrates the change in position of the expanding rollers which may be produced by comparatively small changes in the position of the sleeve and spindle. At (a) in this figure are shown, by dotted lines, the position of the expanding rollers when the surfaces (i) and (g) of the spindle and sleeve have been brought into the positions indicated by the dotted lines for these parts.

The rollers (a) constructed with convex, spherical or spheroidal bodies and conical or tapered ends are a feature of the invention. In expanders as heretofore constructed the rollers act upon the same surfaces of the tube or pipe during the entire operation and the driving effort necessary is approximately constant and is transmitted to the rollers through approximately constant frictional contact areas. If through irregularities of surface of the tube or other causes, the rollers are subject to extra resistance, they are apt to, and often do, stick and fail to rotate, and so make the expander inoperative. By forming the rollers in accordance with my invention the expansion is carried out progressively, the rollers first contacting over very small areas of the tube or pipe and forming a path for themselves by rolling the material over this path. The expansion of the tube or pipe is carried on progressively, step by step, gradually increasing areas of the material of the tube or pipe coming into contact with the rollers. At the same time the areas of contact of the rollers with the surfaces (*g*) and (*i*) of the driving parts increase in proportion to the increase in area of contact of the rollers with the material of the tube and with the pressure which it is necessary to put upon them to effect the rolling of the material. This insures a frictional contact of the rollers with the driving elements adequate and in proportion to the driving effort which must be transmitted in order to force the rollers to rotate as the resistance to rotation increases with increasing area of contact of the rollers with the tube or pipe and insures at the same time areas of contact of the rollers and driving elements so proportioned to the increasing pressures upon the rollers as to prevent cutting or deformation of the parts. Expanders constructed in accordance with my invention are capable of expanding a tube or pipe locally in this progressive step by step manner with the expenditure of much less energy and time than is possible with expanders as heretofore constructed, and the successive adjustment of contact surfaces of rollers and driving elements to pressure and driving friction insures freedom from failure in operation due to sticking of the rollers and the avoidance of wear or deformation of parts.

Obviously some features of this invention may be used without others, and the invention may be embodied in widely varying forms.

Therefore, without limiting the invention to the construction shown and described, what I claim and desire to secure Letters Patent for is:

1. The combination of a plurality of rollers constructed with tapered ends, a path for said rollers made in two parts each having tapered surfaces adapted to bear upon tapered surfaces at one end of each of said rollers, a key to prevent the rotation but permit lateral movement of the two parts of said path with relation one to the other, and means for changing the lateral positions of the two parts of said path and thereby change the effective diameter of said path in relation to said rollers, substantially as described.

2. An expander, including, in combination with a plurality of rollers having conical ends, two parts constructed with oppositely inclined conical surfaces adapted to bear upon the conical surfaces of said rollers, a key arranged to prevent rotation but permit lateral movement of said two parts upon one another and means for forcing said two parts toward one another, substantially as described.

3. An expanding device comprising a plurality of expanding rollers each tapering in opposite directions from the central diametrical plane, a spindle constructed with conical surfaces corresponding to and adapted to bear upon one of the taper ends of each of said rollers provided with threads at the other end thereof, a sleeve traversed by said spindle constructed with tapered surfaces at one end thereof adapted to bear upon tapered surfaces at the other ends of said expanding rollers, a key adapted to prevent rotation of said sleeve with respect to said spindle, and a nut engaging with the threads upon said spindle whereby longitudinal movement of said sleeve upon said spindle may be produced substantially as and for the purposes described.

4. An expanding device comprising a plurality of expanding rollers each constructed with double conical surfaces and having a pivot at each end thereof; a cage constructed with elongated bearings to receive said pivots upon said rollers; a spindle threaded at one end thereof and constructed at the other end thereof with conical surfaces adapted to engage with the conical surfaces at one end of said rollers; a sleeve constructed with conical surfaces to engage with the conical surfaces of said rollers at the other ends thereof; a key to prevent relative movement of said spindle with respect to said sleeve, and a nut whereby the conical surfaces upon said sleeve may be caused to approach the conical surfaces upon said spindle; substantially as and for the purposes described.

5. An expander, including in combination with a plurality of rollers constructed with working surfaces which are surfaces of spheres whose centers are at the axes of the rollers and driving surfaces which are oppositely inclined conical surfaces whose axes coincide with the axes of the rollers, a path for said rollers in two parts, each adapted to bear upon the conical driving surfaces of said rollers, and means for varying the relative positions of the two parts of said path to change the effective diameter thereof in relation to said rollers, substantially as described.

In testimony whereof I have signed this specification in the presence of two subscribing witnesses.

WILLIAM R. HAYSOM.

Witnesses:
Jas. M. Gibbs,
H. G. Gillmer.